(12) United States Patent
Casper et al.

(10) Patent No.: US 6,832,338 B2
(45) Date of Patent: Dec. 14, 2004

(54) APPARATUS, METHOD AND COMPUTER PROGRAM PRODUCT FOR STOPPING PROCESSORS WITHOUT USING NON-MASKABLE INTERRUPTS

(75) Inventors: Corene Casper, Round Rock, TX (US); Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 09/833,336

(22) Filed: Apr. 12, 2001

(65) Prior Publication Data

US 2002/0152330 A1 Oct. 17, 2002

(51) Int. Cl.[7] ................................................. G06F 11/00
(52) U.S. Cl. ........................................................ 714/35
(58) Field of Search .............................. 714/35, 34, 39, 714/32, 18, 15, 16, 38, 30, 31, 11–13; 709/102, 106, 108, 208, 221, 222, 248; 710/260, 261

(56) References Cited

U.S. PATENT DOCUMENTS

| | | | |
|---|---|---|---|
| 5,367,697 A | * 11/1994 | Barlow et al. ............... | 713/330 |
| 5,978,838 A | * 11/1999 | Mohamed et al. .......... | 709/208 |
| 6,003,129 A | * 12/1999 | Song et al. .................. | 712/244 |
| 6,061,711 A | * 5/2000 | Song et al. .................. | 718/108 |
| 6,356,960 B1 | * 3/2002 | Jones et al. .................... | 710/5 |
| 6,457,124 B1 | * 9/2002 | Edwards et al. ............. | 713/100 |
| 2002/0116600 A1 | * 8/2002 | Smith et al. ................. | 712/218 |
| 2003/0061258 A1 | * 3/2003 | Rodgers et al. ............. | 709/102 |

\* cited by examiner

Primary Examiner—Nadeem Iqbal
(74) Attorney, Agent, or Firm—Duke W. Yee; Volel Emile; Stephen J. Walder, Jr.

(57) ABSTRACT

An apparatus, method and computer program product for stopping processors in a multiprocessor system without using non-maskable interrupts are provided. With the apparatus, method and computer program product, at system initialization time, a copy of the operating system (OS) kernel is copied to a new physical location in memory. When a processor enters the debugger due to the occurrence of an event, the debugger switches its virtual-to-physical address mapping to point to the new copy of the OS kernel. The original copy of the OS kernel is then modified by inserting breakpoints, e.g., interrupts, in a repeating pattern in the text of the original copy of the OS kernel, with the exception of the breakpoint handler text in the original copy of the OS kernel. A cache flush of the remaining processors is then instigated thereby forcing the remaining processors to refetch instructions from the OS kernel. When the remaining processors fetch the OS kernel instructions, the instructions are fetched from the modified OS kernel. Thus, the processors encounter the inserted breakpoints and enter a breakpoint handler. The breakpoint handler then, by virtue of the switched virtual-to-physical address mapping, redirects the processor to the new copy of the OS kernel and handles the breakpoint in a normal fashion, e.g. causes the processor to enter the debugger.

29 Claims, 2 Drawing Sheets

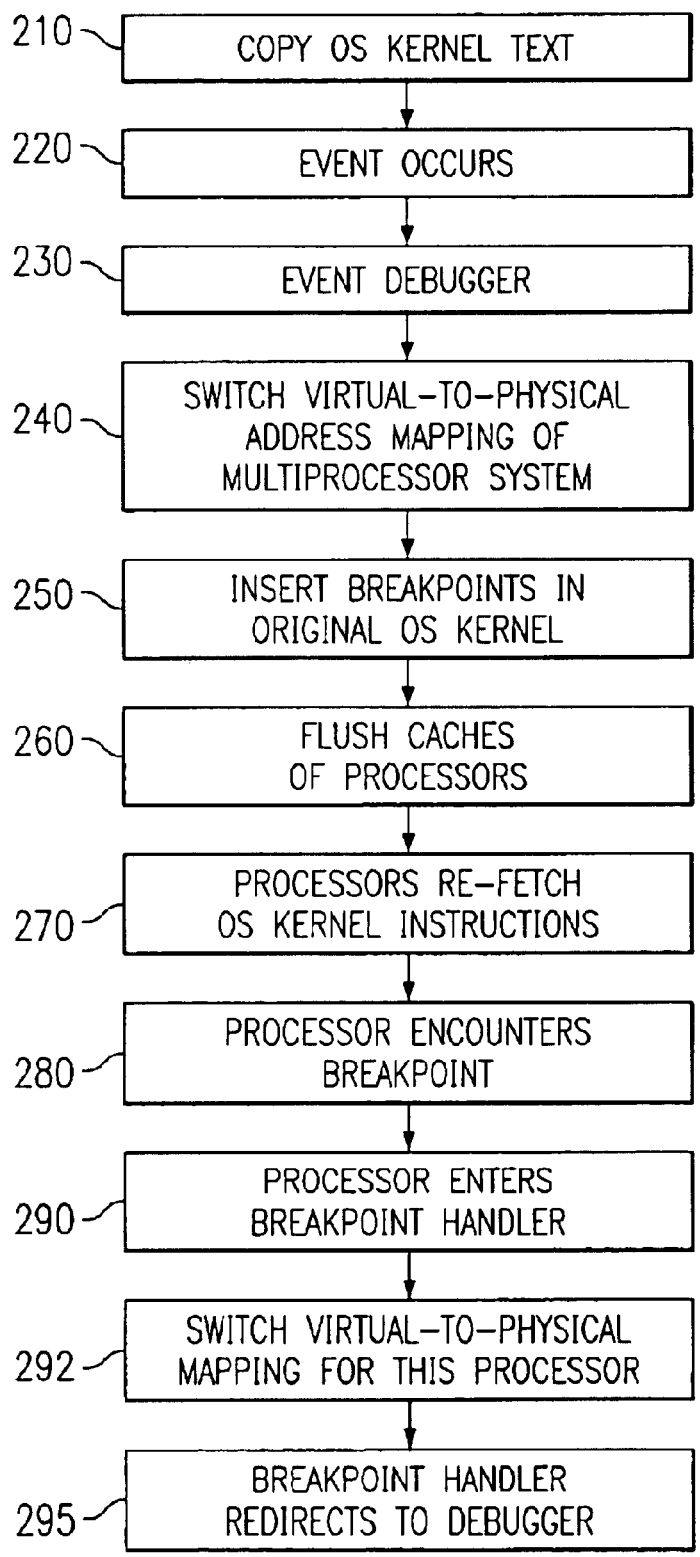

APPARATUS, METHOD AND COMPUTER PROGRAM PRODUCT FOR STOPPING PROCESSORS WITHOUT USING NON-MASKABLE INTERRUPTS

BACKGROUND OF THE INVENTION

1. Technical Field

The present invention is directed to an apparatus, method, and computer program product for stopping processors without using non-maskable interrupts. More specifically, the present invention is direct to an apparatus, method and computer program product for stopping processors in a multiprocessor system that have interrupts disabled without using non-maskable interrupts.

2. Description of Related Art

In multiprocessor systems, there are times when a processor in the multiprocessor system experiences an event, or the debugger is entered, yet the software is unable to stop all of the other processors. An "event" is any occurrence that causes one of the processors to enter a debugger, e.g. an error, an exception, an interrupt, or the like. This is usually due to the other processors looping in a portion of code that is in a disabled state, i.e. code that has disabled interrupts on the processor.

This situation has typically been handled by the use of interrupts. An interrupt is a signal informing a program that an event has occurred. When a program receives an interrupt signal, it takes a specified action (which can be to ignore the signal). Interrupt signals can cause a program to suspend itself temporarily to service the interrupt.

Interrupt signals can come from a variety of sources. For example, every keystroke on a keyboard generates an interrupt signal. Interrupts can also be generated by other devices, such as a printer, to indicate that some event has occurred. These are called hardware interrupts.

Interrupt signals initiated by programs are called software interrupts. A software interrupt is also called a trap or an exception. Each type of software interrupt is associated with an interrupt handler, i.e. a routine that takes control when the interrupt occurs. For example, when a key is pressed on a keyboard, this action triggers a specific interrupt handler. The complete list of interrupts and associated interrupt handlers is stored in a table called the interrupt vector table.

The particular interrupt used to address the problem described above with regard to multiprocessor systems is called a non-maskable interrupt. A non-maskable interrupt (NMI) is a high-priority interrupt that cannot be disabled by another interrupt. NMIs are used to report malfunctions such as parity, bus and math coprocessor errors. The NMI is non-maskable in that this interrupt can not be disabled by software and cannot be ignored by the system.

Not all multiprocessor systems support NMI and thus, not all multiprocessor systems are capable of using NMI to stop processors that are looping in disabled code when an event on one of the processors occurs. Moreover, even on multiprocessor systems that support an NMI mechanism, asserting the NMI from software in a recoverable way in order to stop other processors in the system is not a simple task. Thus, it would be beneficial to have an apparatus, method and computer program product for stopping processors in a multiprocessor system without using NMI.

SUMMARY OF THE INVENTION

The present invention provides an apparatus, method and computer program product for stopping processors in a multiprocessor system without using non-maskable interrupts. With the apparatus, method and computer program product of the present invention, at system initialization time, a copy of the operating system (OS) kernel is copied to a new physical location in memory. When a processor enters the debugger due to the occurrence of an event, such as encountering a breakpoint, a trigger, a watchpoint, the occurrence of an error, or the like, the debugger switches its virtual-to-physical address mapping to point to the new copy of the OS kernel. The original copy of the OS kernel is then modified by inserting breakpoints, e.g., interrupts, in a repeating pattern in the text of the original copy of the OS kernel, with the exception of the breakpoint handler text in the original copy of the OS kernel.

The debugger then performs architecture dependent actions to flush the executing processors' data caches so that the modifications are present in memory and therefore, visible to the instruction stream of the other processors. The debugger then performs architecture dependent actions to broadcast instruction cache invalidate operations to thereby force the processors to refetch instructions from the OS kernel.

When the remaining processors fetch the OS kernel instructions, the instructions are fetched from the modified OS kernel. Thus, the processors encounter the inserted breakpoints and enter a breakpoint handler. The breakpoint handler then, by virtue of the switched virtual-to-physical address mapping, redirects the processor to the new copy of the OS kernel and handles the breakpoint in a normal fashion, e.g. causes the processor to enter the debugger. The debugger, at this point, now has control over all of the processors in the multiprocessor system. Thus, the debugger is now able to diagnose what the other processors in the multiprocessor system were doing at the time the event occurred. Once the event is handled, i.e. the debugger is exited, the original OS kernel may be recovered from the new copy, the virtual-to-physical mapping may be reset to its original state, and the system may be recovered.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a diagram illustrating the operation of the data processing system when the present invention is employed.

DETAILED DESCRIPTION OF THE PREFERRED EMBODIMENT

Figure 1:
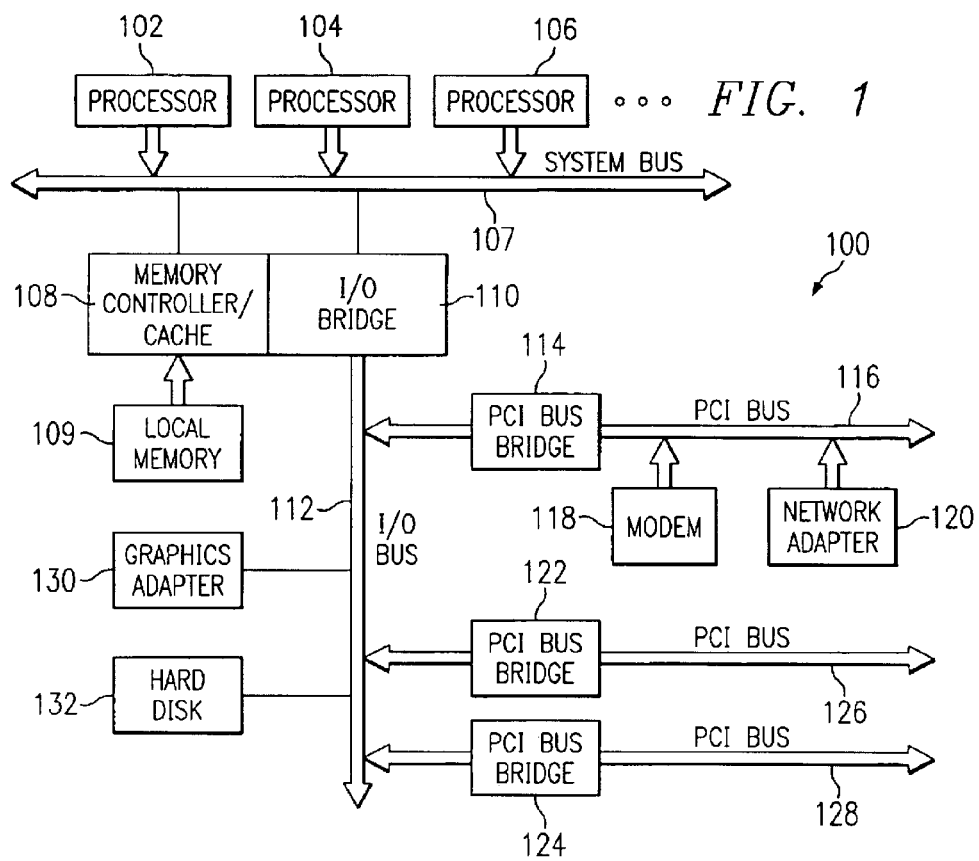
FIG. 1 is an exemplary block diagram of a data processing system in accordance with the present invention.

With reference now to the figures, FIG. 1 is a block diagram of a multiprocessor data processing system in which the present invention may be employed. As shown in FIG. 1, the data processing system 100 may be a symmetric multiprocessor (SMP) system, a Non-Uniform Memory Access (NUMA) system, or other multiprocessor system that includes a plurality of processors 102–106 connected to system bus 107. Also connected to system bus 107 is memory controller/cache 108, which provides an interface to local memory 109. I/O bus bridge 110 is connected to system bus 107 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI bus 116. Typical PCI bus implementations will support four PCI expansion slots or add-in connectors. Communications links to other devices, networks, and the like, may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. Moreover, many of the elements shown in FIG. 1 may not be present in the data processing system in which the present invention is employed. The depicted example is not meant to imply architectural limitations with respect to the present invention.

The data processing system depicted in FIG. 1 may be, for example, an IBM RISC/System 6000 system, a product of International Business Machines Corporation in Armonk, N.Y., running the Advanced Interactive Executive (AIX) operating system.

The present invention may be implemented in hardware, software, or a combination of hardware and software within the multiprocessor system. For example, the present invention may be implemented as a hardware based debugger element in the multiprocessor system, as instructions executed by one or more of the processors in the multiprocessor system, or the like. Some of the beneficial aspects of the present invention are that the present invention does not require external hardware or internal hardware support, can work across the spectrum of known computer systems (whether they support NMI or not), and allows a self-hosted debugger to perform the functions of the present invention.

FIG. 2 is a diagram illustrating the operation of the data processing system of FIG. 1 when the present invention is employed. As shown in FIG. 2, the operation starts with initialization of the system at which time the OS kernel is copied to a new physical location (210). The copying of the OS kernel and debugger in a preferred embodiment, involves copying the OS kernel and debugger text using text replication. However, other mechanisms for copying the OS kernel to a new physical location may be utilized without departing from the spirit and scope of the present invention. Moreover, the copying of the OS kernel may be performed at other times than at system initialization, such as, for example, when an event occurs and the debugger is entered.

At some time later, an event occurs in one or more of the processors of the multiprocessor data processing system (220). An "event" is any occurrence that causes one of the processors in the multiprocessor system to enter a debugger, e.g. an error, an exception, an interrupt, or the like. The debugger for the processor is entered (230). The debugger switches the virtual-to-physical address mapping of the processor so that the mapping now points to the new copy of the OS kernel (240). The virtual-to-physical switching is a processor architecture dependent action which translates to reinitializing page table entries or translation lookaside buffers (TLBs). It involves pointing the virtual addresses to different physical addresses.

The debugger then inserts breakpoints, e.g., interrupts, in the original copy of the OS kernel (250). The insertion of the breakpoints, in a preferred embodiment, involves inserting a repeating pattern of architecture dependent breakpoint instruction (also referred to as "trap" instruction or "interrupt" instruction) opcodes into all portions of the OS kernel with the exception of the breakpoint handler. This is because the breakpoint handler must continue to be able to handle breakpoints as they occur.

For example, a breakpoint may instruct a processor to throw an exception causing the processor to initiate a debugger. The repeating pattern may be such that, for example, every other instruction is a breakpoint instruction, thereby assuring that no matter where in the OS kernel a processor retrieves instructions, at least one breakpoint instruction will be encountered.

The debugger then performs architecture specific functions to flush the caches of the other processors in the multiprocessor system to thereby force the processors to re-fetch the instructions which they were executing (260) from the OS kernel. Such architecture specific functions to flush the caches may include, for example, issuing a data cache block flush instruction (dcbf) in a PowerPC architecture or a flush cache (fc) instruction in an IA64 architecture. Moreover, an instruction to invalidate the instruction cache may also be used, such as instruction cache block invalidate (icbi) in the PowerPC architecture or the flush cache (fc) instruction in the IA64 architecture.

Once the processor caches are flushed, the processors then refetch their instructions from the OS kernel (270) and encounter the inserted breakpoints (280). The breakpoints cause the processors to enter the breakpoint handler of the modified OS kernel (290). Once the processors enter the breakpoint handler of the modified OS kernel, the virtual-to-physical mapping of the processor is switched to point to the new copy of the OS kernel (292). Such switching is facilitated by code in the breakpoint handler that identifies when one or more other processors in the multiprocessor system have switched to a different copy of the OS kernel. Such identification may make use of a global flag, for example. The new copy of the OS kernel then causes the breakpoint handler to instruct the processor to enter the debugger (295).

As an example of the functioning of the present invention, the physical address 0x2000 may contain an original copy of kernel while the physical address 0x8000 may contain a new copy of kernel. For the normal running kernel, virtual address 0xC0000000 is mapped to physical address 0x2000, and this mapping is true for all processors in the system. Thus, every processor uses virtual address 0xC0000000 to access kernel.

When the first processor enters the debugger, this processor switches its translation hardware so that its virtual address 0xC0000000 now maps to physical address 0x8000, i.e. The new copy of the OS kernel. All processors are still running the kernel at virtual address 0xC0000000, but now one of them is actually using a different physical copy.

After the debugger inserts breakpoints in the original physical copy of the OS kernel (at physical address 0x2000), the other processors encounter the breakpoints and enter the breakpoint handler (a portion of the 0x2000 text that was not modified to include breakpoints). The code in the breakpoint handler recognizes (via a global flag) that another processor has switched to a new copy of OS kernel, and the other processors do the same, i.e. they change their translation hardware to map 0xC0000000 to 0x8000. The processors are then all running the new copy of the OS kernel.

In this way, the debugger now gains control over each of the processors in the multiprocessor system, i.e. the looping of the processors is stopped by entering the debugger. Some of these processors may have been in a fully disabled state and the debugger would not have been able to gain control over these processors in the prior art systems without the benefit of the present invention.

Figure 3:
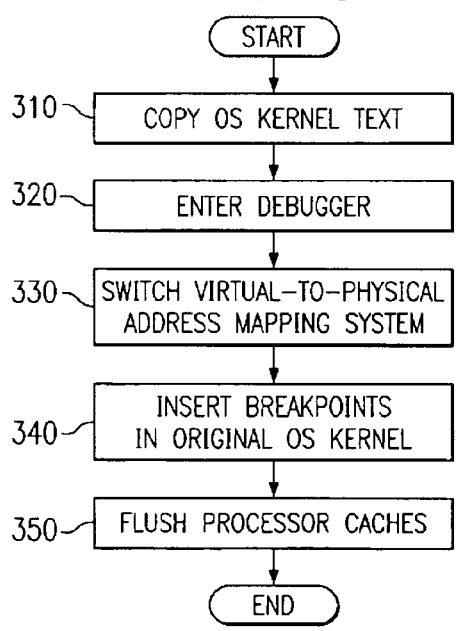
FIG. 3 is a flowchart outlining an exemplary operation of the present invention.

FIG. 3 is a flowchart outlining an exemplary operation of the present invention. While the operational steps shown in FIG. 3 are shown in an exemplary order, the order of certain steps in the operation in FIG. 3 may be rearranged without departing from the spirit and scope of the present invention. For example, steps 310 and 320, as will be described hereafter, may be swapped such that copying of the OS kernel may be performed after entry into the debugger.

As shown in FIG. 3, the operation starts with copying the OS kernel to a new physical location (step 310). An event occurs and the debugger is entered (step 320). The virtual-to-physical address mapping of the processors is switched to point to the new copy of the OS kernel (step 330). Breakpoints are inserted into the original copy of the OS kernel in all portions with the exception of the breakpoint handler (step 340). Actions to flush the executing processors' data caches are performed (step 350) and the operation ends. By virtue of this operation, the processors then refetch the instructions from the modified OS kernel, encounter a breakpoint, enter the breakpoint handler of the OS kernel and are redirected to the debugger.

Thus, the present invention provides a mechanism by which all of the processors in a multiprocessor system may be stopped when there is an occurrence of an event that causes entry into a debugger. With the present invention, even processors that are in a fully disabled state, i.e. are looping on disabled instructions, may be stopped using the present invention. Furthermore, the present invention may be used regardless of whether the multiprocessor system supports NMIs. Moreover, the present invention provides a mechanism by which all of the processors in a multiprocessor system may be stopped and recovery of the system may be performed with ease.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of event handling in a multiprocessor system, comprising:

encountering the event by one processor in the multiprocessor system;

stopping at least one other processor of the multiprocessor system by forcing the at least one other processor to fetch instructions from a copy of an operating system kernel having at least one breakpoint;

copying an original version of an operating system kernel to a new physical location of memory in order to generate a new version of the operating system kernel;

switching address mapping of the multiprocessor system to direct mapping to the new version of the operation system kernel; and inserting the at least one breakpoint in the original version of the operating system kernel to generate the copy of the operating system kernel having at least one breakpoint.

2. The method of claim 1, further comprising:

causing one or more caches of the at least one other processor of the multiprocessor system to be flushed to thereby force the at least one other processor to fetch instructions.

3. The method of claim 1, wherein the at least one other processor encounters the at least one breakpoint and enters a breakpoint handler of the copy of the operating system kernel, and wherein the processors are redirected to a debugger.

4. The method of claim 1, wherein the steps of switching address mapping and inserting at least one breakpoint are performed in response to the occurrence of an event.

5. The method of claim 4, wherein the event is encountering one of a breakpoint, a trigger, a watchpoint, or the occurrence of an error.

6. The method of claim 3, wherein the breakpoint handler is unmodified from the breakpoint handler in the original copy of the operating system kernel.

7. The method of claim 1, wherein inserting at least one breakpoint in the original copy of the original operating system kernel includes inserting a repeating pattern of breakpoint instruction opcodes into all portions of the original copy of the operating system kernel with the exception of a breakpoint handler in the original copy of the operating system kernel.

8. The method of claim 1, wherein the multiprocessor system is a multiprocessor system that does not support the use of non-maskable interrupts.

9. The method of claim 1, wherein the multiprocessor system is one of a symmetric multiprocessor system and a non-uniform memory access system.

10. An apparatus for handling an event in a multiprocessor system, comprising:

means for copying an original copy of an operating system kernel to a new physical location of memory in order to generate a new copy of the operating system kernel;

means for switching address mapping of the multiprocessor system to direct mapping to the new copy of the operation system kernel;

means for inserting at least one breakpoint in the original copy of the operating system kernel to generate a modified copy of the operating system kernel, wherein when a processor of the multiprocessor system is forced to fetch an instruction from the modified copy of the operating system kernel, the processor is redirected to the new copy of the operating system kernel to thereby handle the event.

11. The apparatus of claim 10, further comprising:

means for causing one or more caches of processors of the multiprocessor system to be flushed.

12. The apparatus of claim 11, wherein the processors of the multiprocessor system refetch instructions from the modified copy of the operating system kernel and encounter the inserted at least one breakpoint.

13. The apparatus of claim 12, wherein the processors enter a breakpoint handler of the modified copy of the operating system kernel, and wherein the processors are redirected to a debugger.

14. The apparatus of claim 10, wherein the means for switching address mapping and means for inserting at least one breakpoint are operable in response to the occurrence of an event.

15. The apparatus of claim 14, wherein the event is encountering one of a breakpoint, a trigger, a watchpoint, or the occurrence of an error.

16. The apparatus of claim 13, wherein the breakpoint handler is unmodified from the breakpoint handler in the original copy of the operating system kernel.

17. The apparatus of claim 10, wherein the means for inserting at least one breakpoint in the original copy of the original operating system kernel includes means for inserting a repeating pattern of breakpoint instruction opcodes into all portions of the original copy of the operating system kernel with the exception of a breakpoint handler in the original copy of the operating system kernel.

18. The apparatus of claim 10, wherein the multiprocessor system is a multiprocessor system that does not support the use of non-maskable interrupts.

19. The apparatus of claim 11, wherein the multiprocessor system is one of a symmetric multiprocessor system and a non-uniform memory access system.

20. A computer program product in a computer readable medium for handling an event in a multiprocessor system, comprising:

first instructions for copying an original copy of an operating system kernel to a new physical location of memory in order to generate a new copy of the operating system kernel;

second instructions for switching address mapping of the multiprocessor system to direct mapping to the new copy of the operation system kernel; and third instructions for inserting at least one breakpoint in the original copy of the operating system kernel to generate a modified copy of the operating system kernel, wherein when a processor of the multiprocessor system is forced to fetch an instruction from the modified copy of the operating system kernel, the processor is redirected to the new copy of the operating system kernel to thereby handle the event.

21. The computer program product of claim 20, further comprising:

fourth instructions for causing one or more caches of processors of the multiprocessor system to be flushed.

22. The computer program product of claim 20, wherein the third instructions include instructions for inserting a repeating pattern of breakpoint instruction opcodes into all portions of the original copy of the operating system kernel with the exception of a breakpoint handler in the original copy of the operating system kernel.

23. An apparatus for handling an event in a multiprocessor system, comprising:

a memory; and a debugger coupled to the memory, wherein the memory includes an original copy of an operating system kernel and a new copy of the operating system kernel that is in a different physical location of the memory from the physical location of the original copy of the operating system kernel, and wherein the debugger, in response to an event, switches address mapping of the multiprocessor system to direct mapping to the new copy of the operation system kernel and inserts at least one breakpoint in the original copy of the operating system kernel to generate a modified copy of the operating system kernel.

24. The apparatus of claim 23, wherein the debugger performs one or more actions to cause one or more caches of processor of the multiprocessor system to be flushed.

25. The apparatus of claim 23, wherein the event is encountering one of a breakpoint, a trigger, a watchpoint, or the occurrence of an error.

26. The apparatus of claim 23, wherein the debugger inserts at least one breakpoint by inserting a repeating pattern of breakpoint instruction opcodes into all portions of the original copy of the operating system kernel with the exception of a breakpoint handler in the original copy of the operating system kernel.

27. The apparatus of claim 23, wherein the multiprocessor system is a multiprocessor system that does not support the use of non-maskable interrupts.

28. The apparatus of claim 23, wherein the multiprocessor system is one of a symmetric multiprocessor system and a non-uniform memory access system.

29. A method for handling an event in a multiprocessor system, comprising:

copying an original copy of an operating system kernel to a new physical location of memory in order to generate a new copy of the operating system kernel;

switching address mapping of the multiprocessor system to direct mapping to the new copy of the operation system kernel;

inserting at least one breakpoint in the original copy of the operating system kernel to generate a modified copy of the operating system kernel, wherein when a processor of the multiprocessor system is forced to fetch an instruction from the modified copy of the operating system kernel, the processor is redirected to the new copy of the operating system kernel to thereby handle the event.

* * * * *

UNITED STATES PATENT AND TRADEMARK OFFICE
CERTIFICATE OF CORRECTION

PATENT NO. : 6,832,338 B2  
DATED : December 14, 2004  
INVENTOR(S) : Casper et al.

It is certified that error appears in the above-identified patent and that said Letters Patent is hereby corrected as shown below:

Column 8,  
Line 6, after "claim" delete "11" and insert -- 10 --.  
Line 54, before "of the multiprocessor" delete "processor" and insert -- processors --.

Signed and Sealed this

Fourteenth Day of March, 2006

JON W. DUDAS  
*Director of the United States Patent and Trademark Office*